United States Patent
Robinson et al.

(10) Patent No.: US 7,508,589 B2
(45) Date of Patent: Mar. 24, 2009

(54) SOFT APERTURE CORRECTION FOR LENTICULAR SCREENS

(75) Inventors: Michael G. Robinson, Boulder, CO (US); Lenny Lipton, Los Angeles, CA (US)

(73) Assignee: Real D, Beverly Hills, CA (US)

( * ) Notice: Subject to any disclaimer, the term of this patent is extended or adjusted under 35 U.S.C. 154(b) by 0 days.

(21) Appl. No.: 11/880,828

(22) Filed: Jul. 23, 2007

(65) Prior Publication Data

US 2008/0186574 A1    Aug. 7, 2008

Related U.S. Application Data

(63) Continuation-in-part of application No. 11/701,995, filed on Feb. 1, 2007.

(51) Int. Cl.
*G02B 27/10* (2006.01)
(52) U.S. Cl. ...................... 359/619; 359/463
(58) Field of Classification Search .......... 355/17, 355/22, 463, 619, 419; 359/419, 463
See application file for complete search history.

(56) References Cited

U.S. PATENT DOCUMENTS

| 6,443,579 | B1 | 9/2002 | Myers |
| 6,869,195 | B2 | 3/2005 | Hannington |
| 7,123,287 | B2 | 10/2006 | Surman |

FOREIGN PATENT DOCUMENTS

| JP | 2000075429 A | | 3/2000 |
| KR | 10-2005-0090895 | * | 9/2005 |

* cited by examiner

*Primary Examiner*—Ricky L Mack
*Assistant Examiner*—Vipin M Patel
(74) *Attorney, Agent, or Firm*—Smyrski Law Group, A P.C.

(57) ABSTRACT

An apparatus including an autostereoscopic image selection device having a plurality of lenticules is provided. The autostereoscopic image selection device has an opaque material applied thereto in gaps between the plurality of lenticules. The opaque material is applied to the autostereoscopic image selection device in a soft aperturing manner, the soft aperturing manner comprising applying the opaque material such that the opaque material is tapered from the gaps over the plurality of lenticules. The opaque material can be applied in accordance with a windowing function.

22 Claims, 11 Drawing Sheets

SOFT APERTURE CORRECTION FOR LENTICULAR SCREENS

This application is a continuation-in-part of co-pending U.S. patent application Ser. No. 11/701,995, entitled "Aperture Correction for Lenticular Screens," inventor Lenny Lipton, filed Feb. 1, 2007, the entirety of which is incorporated herein by reference.

BACKGROUND OF THE INVENTION

1. Field of the Invention

The present design relates generally to the art of autostereoscopic displays, and more specifically to enhanced techniques for flat panel monitor devices that improve optical quality, and increase the depth of the image and the number and quality of the viewing zones.

2. Description of the Related Art

Today's stereoscopic display manufacturers seek to continually improve the image quality associated with the presentation of three-dimensional (3-D) content. One current autostereoscopic flat panel monitor device that exhibits improved image quality uses refractive optic techniques for image selection. Refractive optic designs typically include lenticular screens and Winnek slanted lenses. Another current flat panel monitor design relies on raster barrier techniques for image selection. In both designs, columns of images consisting of stripes made up of perspective views form a repeating pattern on the autostereoscopic display. Refractive optic techniques involve associating each column of images with a cylindrical lenticule. Raster barrier techniques associate each column of images with an aperture slit of a raster barrier.

Autostereoscopic display designs have been the subject of several prior disclosures. Reference is made to the work of, for example, Okoshi in "Three-Dimensional Imaging Techniques", Academic Press, New York, 1976.

An alternate technology currently available for use in flat panel monitor device designs employs a "fly eye lens" technique for image selection. This technique involves a number of related miniature spherical lenses refracting light rays in both the vertical and the horizontal direction.

As noted, refractive optic autostereoscopic display techniques employ parallel rows of cylindrical lenticules, while raster barrier autostereoscopic display techniques employ parallel rows of slits. Both techniques produce a parallax effect only in the horizontal direction, unlike the "fly's eye lens" that produces parallax effects in both the vertical and horizontal directions. Accordingly, the refractive and raster barrier techniques involve horizontal parallax exclusively. Refractive and raster barrier designs can produce images with lower resolution requirements since they selectively use image information in the horizontal direction only, rather than in both the vertical and the horizontal directions.

In practice, designs employing lenticular autostereoscopic screens have drawbacks because they reduce the overall effective display sharpness. In particular, autostereoscopic displays that employ a lenticular screen for image selection tend to have shortcomings with regard to the sharpness of the image having high parallax values. Such shortcomings are particularly apparent with regard to images including objects appearing off the plane of the screen or very deep into the screen. Further issues with lenticular screens can occur when a multiplicity of non-primary viewing zones exist, particularly with respect to the sharpness of those non-primary viewing zones.

In practice, designs employing raster barrier displays reduce the overall display brightness and introduce undesirable visible pattern noise. In fact, raster barrier autostereoscopic screens turn out to be so dim, typically losing 80 or 90 percent of the light when rendering multi-perspective images, that they may not be commercially viable when used with currently available flat panel displays.

Refractive screens employing "fly eye lens" designs have not been deployed into the marketplace to any extent but have been shown experimentally in laboratories. They have low resolution when employed in connection with a flat panel monitor device.

Autostereoscopic displays using either lenticular screen, raster barrier, or "fly eye lens" techniques are difficult to manufacture due to the tight dimensional and alignment tolerances required when used with the underlying flat panel monitor device electronic display.

Further, it has been noted that certain performance issues, particularly crosstalk due to diffraction of signals transmitted through lenticules and perceived by a viewer, can occur when lenticular arrays are employed.

Based on the foregoing, it would be advantageous to provide a flat panel display device for use in viewing stereoscopic image content that overcomes the foregoing drawbacks present in previously known designs.

SUMMARY OF THE INVENTION

According to one aspect of the present design, there is provided an apparatus comprising an autostereoscopic image selection device having a plurality of lenticules is provided. The autostereoscopic image selection device has an opaque material applied thereto in gaps between the plurality of lenticules. The opaque material is applied to the autostereoscopic image selection device in a soft aperturing manner, the soft aperturing manner comprising applying the opaque material such that the opaque material is tapered from the gaps over the plurality of lenticules. The opaque material can be applied in accordance with a windowing function.

These and other advantages of the present invention will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which.

DETAILED DESCRIPTION OF THE INVENTION

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

The present design combines the virtues of both refractive or lenticular autostereoscopic displays and raster barrier displays. The technique described herein vastly improves the image quality of an autostereoscopic display using refractive lenticular optics, with only a minor reduction in light output.

Lenticular Screens

Autostereoscopic display technology has been applied to flat panel displays with some success. There are two major variants—one using refractive optics for image selection and the other using raster barriers. In both cases, columns of images consisting of stripes made up of perspective views form a repeating pattern on the display. Each column is associated with a cylindrical lenticule or with an aperture slit of a raster barrier. In addition to the refractive and raster barrier techniques, which are essentially optically interchangeable, another technique—the "fly's eye lens"—has also been employed. The fly's eye lens includes a number of miniature spherical lenses that refract in both the vertical and the horizontal direction.

A lenticular screen that includes parallel rows of cylindrical lenticules, or the raster barrier having parallel rows of slits, produce their effect only in the horizontal direction, unlike the fly's eye lens that works in both the vertical and horizontal directions. Accordingly, these techniques involve the use of horizontal parallax exclusively. Because of this restriction, there is the ability to produce a sharper image because the image information is used selectively only in the horizontal direction, rather than in both the vertical and the horizontal.

Standard Lenticular Screens

Figure 1A:
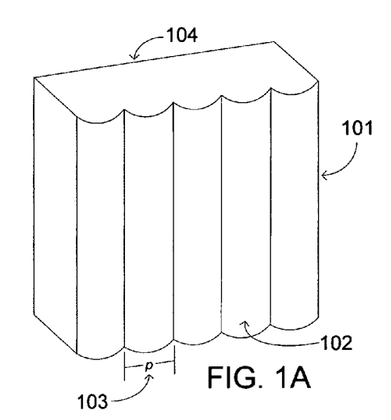
FIGS. 1A, 1B, and 1C are diagrammatic representations of refractive autostereoscopic lens sheets.

In FIG. 1A, a typical lenticular screen 101 is shown with a subject lenticule 102, and the pitch of the screen P is given at point 103. Display surface 104 is shown. The display surface 104 can be any type of display, including but not limited to hard copy or electronic. For the most part the display surface 104 can be either a self-illuminated or rear-illuminated display. The design presented herein results in a reduction in brightness, and thus self-illuminated or rear-illuminated displays can benefit from the present design. Even though the technique can be applied to a hard copy that is not rear-illuminated, the present technique can be applied to rear-illuminated hard copy or electronic displays such as plasma panels, liquid crystal displays, light-emitting diodes, or similar displays that either modulate or emit light.

Figure 1B:
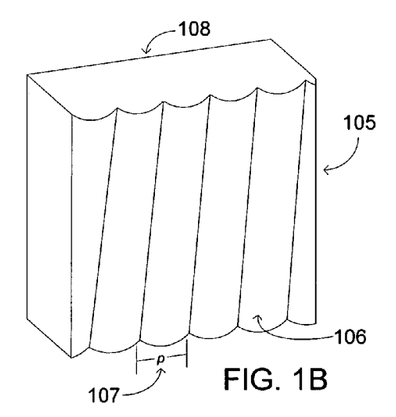

FIG. 1B is a Winnek slanted lens sheet is shown that is highly similar to the screen of FIG. 1A. The difference here is that the lenticules are slanted to the horizontal. Instead of the boundary between lenticules being parallel to the vertical edge of the display, the lenticules are slanted at some angle. The lens sheet 105 is shown with individual lenticule 106 having pitch P 107, with display 108 as shown. The advantage to this type of display has been discussed in, for example, U.S. Pat. No. 3,409,351. The major advantage to the Winnek tipping of the lens sheet is to eliminate pattern noise and color banding or moiré, and to also equalize the resolution in the vertical and the horizontal direction.

Fly's Eye

Figure 1C:
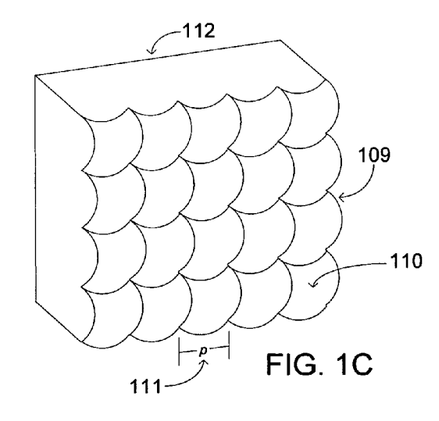

FIG. 1C shows a fly's eye lens sheet 109 with an individual circular lens element 110. The fly's eye lens sheet 109 has a pitch P 111 equal in both the vertical and the horizontal directions, with the display surface 112 oriented as shown. Fly's eye lenticular screens have not been widely accepted in the marketplace but laboratory experiments have demonstrated their performance. Fly's eye lenticular screens are generally difficult to manufacture and also have low resolution when used with a flat panel display. However, they do have interesting properties insofar as they closely resemble holography in terms of their physics and end effect for the viewer.

Raster Barriers

Other designs attempted include the raster barrier display, consisting of a series of zebra-like slits or Ronchi-grating-like slits, with the slits going in the vertical direction. These raster barriers produce an autostereoscopic display having a greater parallax budget before image breakdown occurs.

"Parallax budget" is defined as the useful range of parallax within the display. In-screen parallax is assigned positive values and off-screen parallax is assigned negative values. The greater the absolute value of the parallax, the deeper the appearance of image points associated with those values. Image points with large values of parallax, such as in the autostereoscopic displays discussed herein, tend to lose sharpness or take on unfortunate artifacts such as image doubling. The range of parallax values, or the parallax budget, that can be well represented by the display before image breakdown is a principal quantitative measurement that directly relates to stereoscopic image depth.

Raster barrier designs also have increased and sharper viewing zones. The increased parallax budget is important because parallax information is important in a stereoscopic display. Because raster barrier displays can have a larger parallax budget, the image can appear to be deeper, because parallax is the principal stereoscopic depth cue.

In addition, raster barrier displays can also have a greater number of viewing zones. The reason for the greater number of viewing zones, optically, is that raster barrier displays use slit optics rather than refractive optics and have, in effect, a great deal of depth of focus because the image-forming rays are more nearly parallel as a result of the tiny aperture involved.

The disadvantage of the raster barrier is the dimness, or lack of brightness. In fact, raster barriers are so extremely dim that they may not be commercially viable. Raster barriers require an extremely bright underlying display, and both the commonly used plasma panels and liquid crystal displays lack sufficient brightness to make a satisfactory raster barrier autostereoscopic display. One of the hallmarks of a good display, and one of the most important things about an electronic display, is brightness, and display manufacturers have had a challenge to meet the brightness requirements for a flat panel display. Given the additional brightness limitations of a raster barrier, the quest for a display that meets illumination specifications becomes nearly hopeless, because raster barrier displays for multi-view or stereoscopic imaging typically waste 80 or 90 percent of the light originally transmitted.

Although raster barrier displays may appear easier to manufacture, in point of fact they are not necessarily easier to manufacture than lenticular displays. Both displays have challenges with regard to dimensional tolerances and alignment with regard to the underlying electronic display.

Parallax Issues

Autostereoscopic displays, especially those using lens sheets for image selection, tend to have shortcomings with regard to the sharpness of images having high parallax values, especially with regard to images with objects appearing off the plane of the screen or that go very deep into the plane of the screen. In other words, the parallax budget is limited. Such displays also have issues with both a multiplicity of non-primary viewing zones and the sharpness of those non-primary viewing zones.

Lenticular displays have associated with them, behind each vertical-going lenticule, a column of image information broken up into stripes of perspective views. When viewing an autostereoscopic image image selection takes place at the plane of the screen. The functioning of lenticular screens and their optical characteristics are described in detail in the Okoshi publication. One publication discussing the aberrational correction of photographic optics is Photographic Optics by Arthur Cox, 1974, Focal Press, London, 15th edition.

The accompanying figures showing ray diagrams work to serve as explanation for what is happening optically in FIGS. 1A, 1B, and 1C. In the case of FIGS. 1A and 1B, cylindrical lenticules are employed, so the cross-section surface is assumed to be perpendicular to the intersection of the lenticule boundaries. In the case of FIG. 1A, the cross section is a horizontal plane passed through the lenticules. In the case of FIG. 1B, the cross section is a plane passing through the lenticules, but at an angle to account for the Winnek tip angle—so that the plane that passes through the lenticules is perpendicular to the boundary of intersection of the lenticules, as shown in FIG. 1B. In the case of FIG. 1C, the cross-section could be made at any angle, because the fly's eye lenses at point 109 are sections of a sphere rather than a cylinder.

Figure 2:
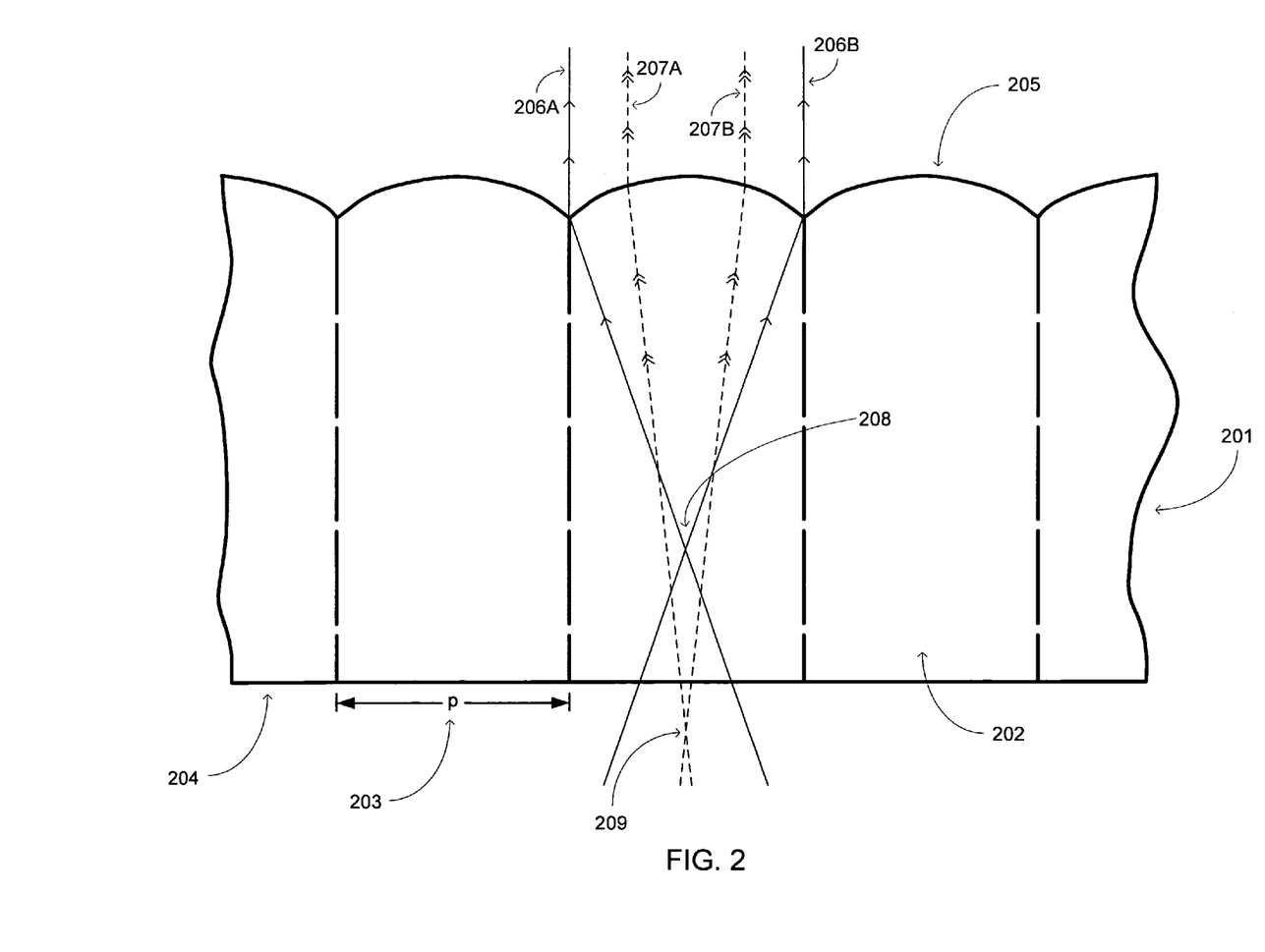
FIG. 2 is a ray diagram illustrating the optics of an individual lenticule and consequent spherical aberration.

From FIG. 2, a cross-section of a lens sheet 201 is shown and an individual lenticule 202 is called out. Pitch P 203 represents the width of a lenticule. Display surface 204 is shown, representing a flat panel display that could be a plasma display screen, a liquid crystal display screen, a light-emitting diode display screen, or any other suitable flat panel display. Curved surface of the lenticule 205 is shown, and rays 206A and 206B are emitted from the display screen 204 after having been refracted by the individual lenticule 202. The arrows are pointing toward the eyes of the observer because the surface produces pixels illuminated in various ways depending upon the display type. Rays 207A and 207B are parallel, but these rays come from the central area of the lens rather than from the boundary edges, and the double-headed arrows indicate the rays. Point 208 is the location where the outermost or boundary rays cross or are in sharp focus, and point 209 is where the central rays 207A and 207B cross—namely, behind the plane of the display surface. Point 208, representing boundary or outermost rays crossing, is in front of the plane of the display surface.

The drawings assume that the rays are monochromatic—that is, the rays are for a single wavelength. Illustrated here is a non-ideal lens having spherical aberration. With reference to FIG. 2, several of the classical aberrations will be described. Those aberrations can be improved by stopping down the lens or by adding an aperture. The present design reduces the numerical aperture (and hence the area of the available lens surface) to improve correction of the aberrations. The present design also can improve the depth of field.

Multiple perspective views required for viewing the image are included within the column P. When looking at a normal display there is no refractive lens sheet, forcing each eye to see individual image points, which produces the stereoscopic effect. In the case of a normal display, there is but a single image point on the display where the eyes converge and focus. However, because of the autostereoscopic display's selection device—the lens sheet—the perspective views incorporated within pitch P 203 are refracted to different locations and seen by the eyes, and the combination of these separate perspectives forms the stereoscopic image.

In the case of lens sheets used for autostereoscopic displays, such lens sheets are single-element devices. In order to achieve good correction (namely, a significant reduction in aberration), lens systems require a complex system of lens elements. These elements have different dispersions and different indices of refraction to compensate for the dispersive properties of light and to produce a decently corrected image.

Simple lens sheets represent an optical system that cannot possibly provide high-quality correction and reduction of aberration. Aberration correction would be a departure from the lenses' ability to produce single, small, clean image points of objects in space. A good overall optical design must produce an image that is sharp and has as high a contrast as possible coming from the display surface. So, in a sense, the optics for this design more nearly resemble the optics of a projector than a camera. The entity or measurement of interest is termed "depth of focus." Depth of focus is the range of acceptable focus that can be sharply resolved with respect to the display plane 204 in the case of FIG. 2.

Note that in the case of lens sheet 201, parallel rays that emerge from the display, namely rays 206A and 206B, have a point of sharp focus at point 209. Rays emerging not from the boundary edges of the lenticules but from the center come to sharp focus at 208. Accordingly, this condition, which has been described as "spherical aberration," cannot produce perfectly sharp images.

Figure 3:
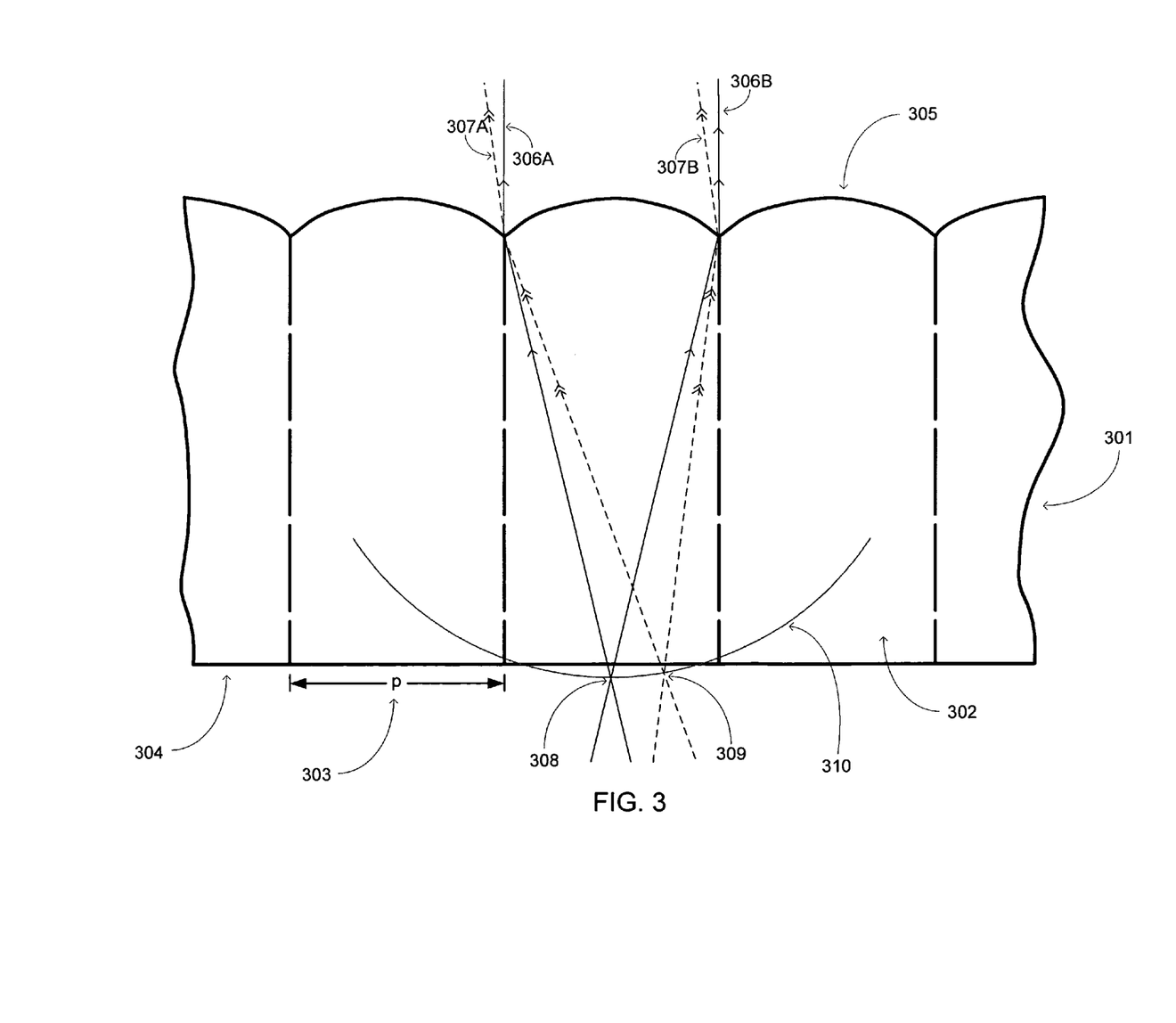
FIG. 3 show the optics of a lenticular screen, and the curvature of field resultant from the simple optics employed.

Looking at FIG. 3, note lens sheet 301 has an individual lenticule 302 and pitch P 303. The display surface is shown as surface 304. In this case curvature of field is illustrated. Once again, the subject light is monochromatic light. The on-axial parallel rays that enter the lens at its very boundary are denoted as rays 306A and 306B. Rays 306A and 306B come to sharp focus at point 308. Rays 307A and 307B enter at the same points of the lens, but are viewed off-axially, and these are denoted by double-headed arrows (whereas 306A and 306B are denoted by single-headed arrows) and come to a sharp focal point 309. Focal point 309 lies on surface 310 that, in the case of a lenticular sheet, is a cylindrical surface with a curvature of fixed radius. If a fly's eye lens is employed rather than a cylindrical surface, the depiction would be a section of a sphere, as denoted by surface 310. And as noted above, the present drawings can serve for either cylindrical lenticules or for a fly's eye lens.

In the case of FIG. 3, the aberration curvature of field limits the effective depth of focus at the image plane 304, because points 308 and 309 are at different distances. This is a condition that is difficult to cure using a single element. The cure advocated herein and that will be described below is one of aperture correction, in which the lenticules are actually stopped down to have a numerically higher aperture and less available area.

Figure 4:
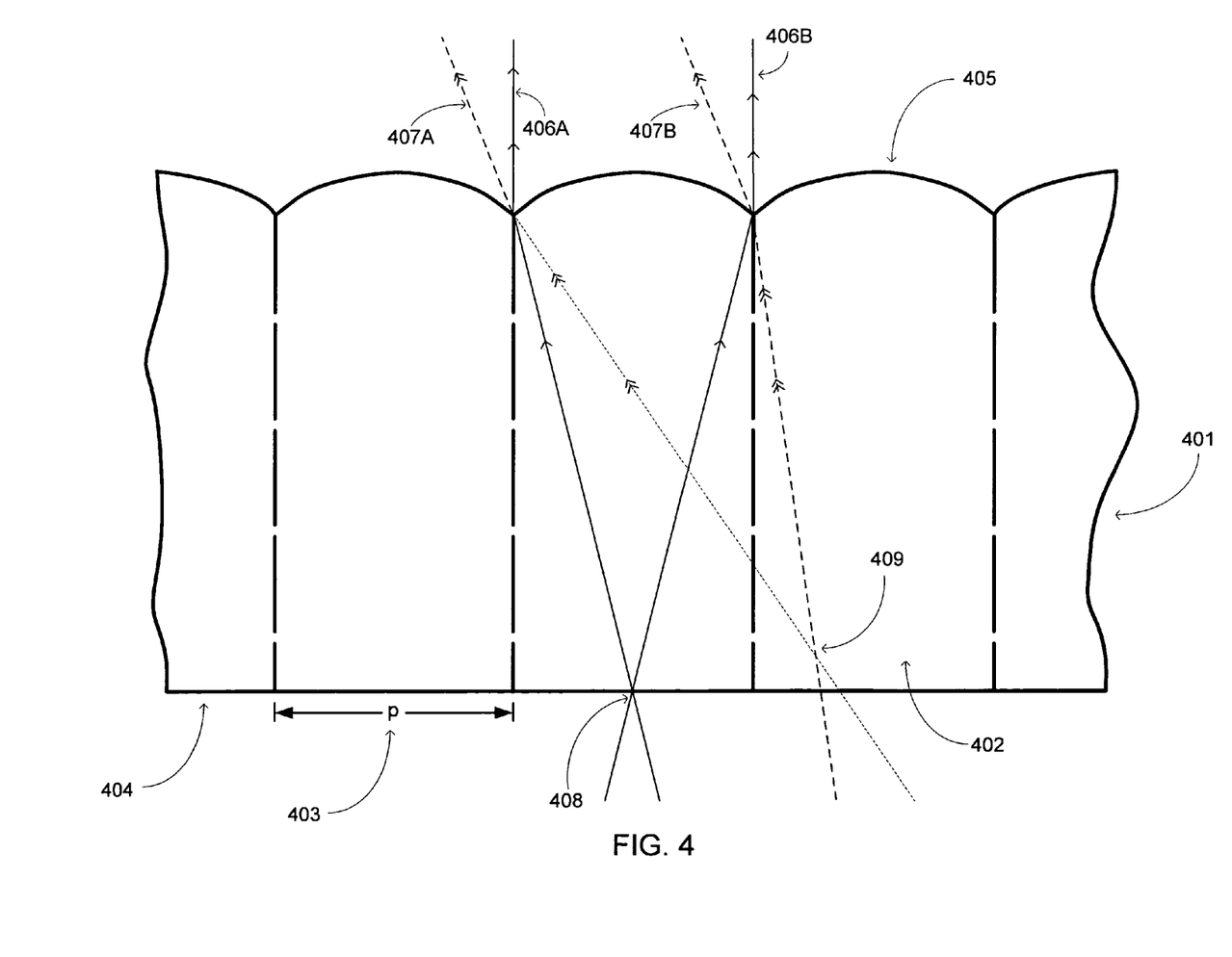
FIG. 4 illustrates a ray tracing of a cross-section of a lenticular screen, highlighting the issue of adjacent viewing zones.

In FIG. 4, lens sheet 401 is shown with individual lenticule 402 having pitch P 403, with a display surface 404. The curvature 405 of the lenticule is shown. The concern is with the observer seeing the adjacent perspective views. When viewing a lenticular autostereoscopic display, the progression or continuum of views can be seen within a viewing zone. In space, some reasonable distance from the display, the eyes of the observer can see a stereoscopic image over a relatively limited angle of view. The angle of view may be as narrow as a few degrees, or as great as several tens of degrees. Once the observer moves to the side, a so-called "flip" occurs, and the rays that heretofore had been associated with the central viewing zone move to adjacent viewing zones.

An individual viewing an autostereoscopic display sees a primary viewing zone, secondary viewing zone, tertiary viewing zone, and so forth. The primary viewing zone—if the display has been properly set up—is on-axis, and is of a certain specifiable angular extent. When the observer moves laterally, he or she sees the columns refracted by the lenticules. These columns are now not directly under the lenticules and on-axis, but instead are the secondary, tertiary, and so forth, columns (which in fact are image columns under other lenticules). The images of the secondary, tertiary, and so forth, columns should be sharp and well corrected. The present design addresses making this improvement using aperture correction.

Regarding raster barriers, autostereoscopic displays using raster barriers tend to have sharper images and more image "pop." That means that the image can apparently emerge further from the screen, and actually go deeper into the screen, without the image breaking down because of aberration defects. In addition, these raster barrier displays have sharper secondary, tertiary, and so forth, viewing zones—and indeed have more of these auxiliary viewing zones, which is an advantage of some significance.

Raster barriers and lenticular screens are optically interchangeable so one can be swapped for the other for a given underlying display. A raster barrier display has narrow openings, or slits. A raster barrier looks like a zebra-stripe grating or a Ronchi grating, and despite the fact that these displays have certain virtues, they have very low brightness for a panoramagram-type display with a multiplicity of perspective views, and also a noticeable pattern noise. Viewing images using a raster barrier resembles looking through a grating, which indeed one is.

With regard to FIG. 4, the familiar elements are shown. Lens sheet 401 is shown, the individual lenticule 402 is presented, width 403 is the width of the lenticule given by pitch P, display surface 404 is shown, and curvature 405 is the curvature of the individual lenticule. Of interest is how the image is formed by the adjacent column. Rays 406A and 406B are seen, and once again only monochromatic rays are assumed and are indicated with single-headed arrows, forming sharp focus at point 408. This case assumes the lens is a perfect lens, and aberration is not a consideration. The concern is with depth of field. When viewing a secondary viewing zone, rays 407A and 407B illustrate what is happening. These rays have double-headed arrows. The rays cross at 409 in lenticule 402, which is a secondary lenticule with regard to the specific rays. In this case sharp focus is not maintained. With regard to tertiary and lenticules that are even further away, focus will be even worse.

Aperture Corrected Design

Figure 5:
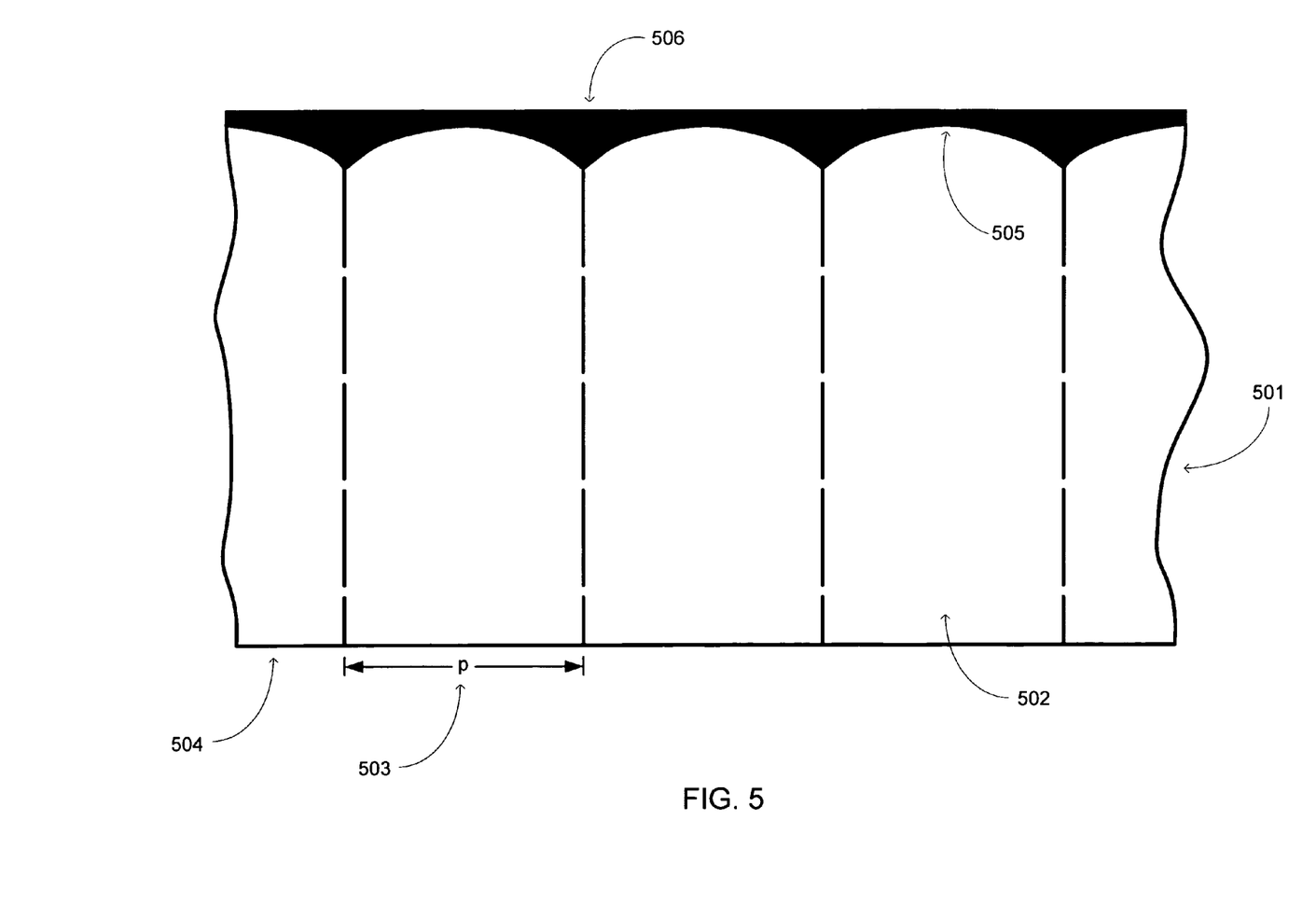
FIG. 5 is a lenticular screen with the over coating as applied in the present design as a manufacturing step in the embodiment described.

In the present design, a material is coated on top of the lenticules and then is removed by buffing. FIG. 5 shows a section of a lens sheet 501, with individual lenticule 502. The lenticule pitch P 503, where display surface 504 is shown. Curve 505 represents the curved surface of a lenticule. Opaque material 506 is applied to the surface. The opaque material can be a waxy material, or another appropriate masking material, including but not limited to INX pigments or other waxy materials.

Figure 6:
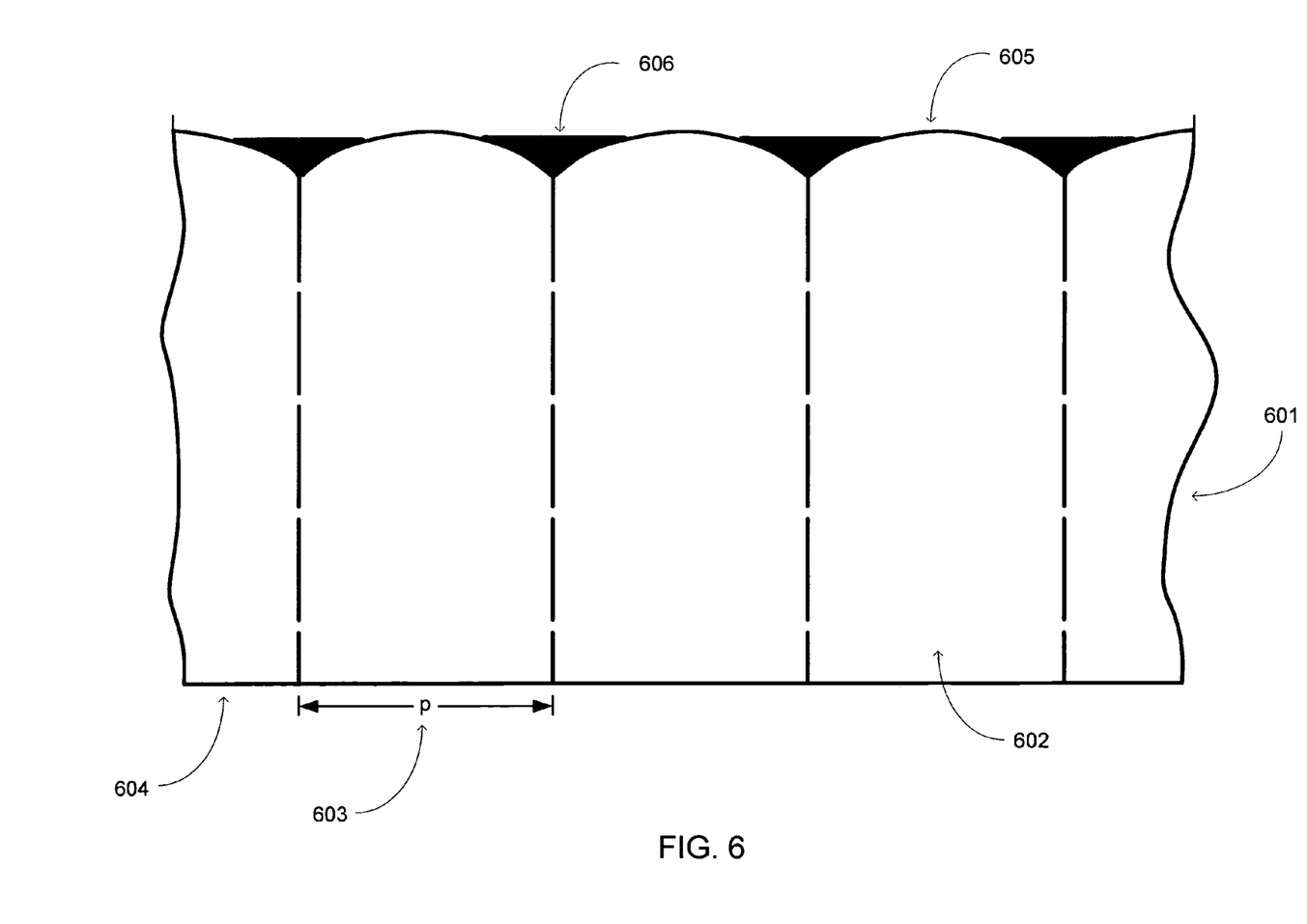
FIG. 6 shows a lenticular screen in the final stage of manufacturing in that the overcoat has been buffed to produce the aperture-corrected lenticular screen in accordance with the present design.

The material is then buffed, as shown in FIG. 6. FIG. 6 shows the corresponding lens sheet identical to that shown as lens sheet 501. Individual lenticule 602 is shown, with pitch P 603, where display surface 604 is shown. Curvature 605 is the curvature of the lens sheet, or the very top surface, while material 606 represents the remaining aperture material.

Once the material 506 has been applied as shown in FIG. 5, depending upon the type of opaque material employed, after a passage of time (which may be very rapid, or may take time for the material to set), the material may be manually buffed or wiped way with a polishing or wiping cloth, or the rubbing, buffing, or polishing performed by a machine. By applying the proper pressure the top surfaces are revealed, forming a reduced section of a cylinder in the case of a lens sheet, or a circle in the case of a fly's eye lens. The result is an aperture reduction.

Lens apertures can be placed at various points in a lens system. They can be placed in front of a simple lens, or behind a simple lens, or they can be placed—probably most efficaciously—within a complex lens system at or near the optical center of the lens. In this case, several issues exist with regard to manufacturing a lens sheet of this type with aperture correction. One is that the optical center of the lens, or the radius of the lens, lies within the lens sheet, so it is difficult or impossible to place an aperture there. An aperture could be placed in other ways, but many of the other ways are difficult, costly, and/or impractical. Placement of an aperture at the display screen causes a loss of pixels and resolution and results in a poor quality picture with pattern noise.

The best place to place the aperture is at the surface of the lens, as described with the aid of FIGS. 5 and 6. This approach is self-locating. Because there are frequently tens of thousands of individual lenticules in such a display, it would be virtually impossible to find a way to manufacture an aperture sheet that could be located in intimate juxtaposition with the lenticules and provide the advantages described herein. Various materials can be used.

Figure 7:
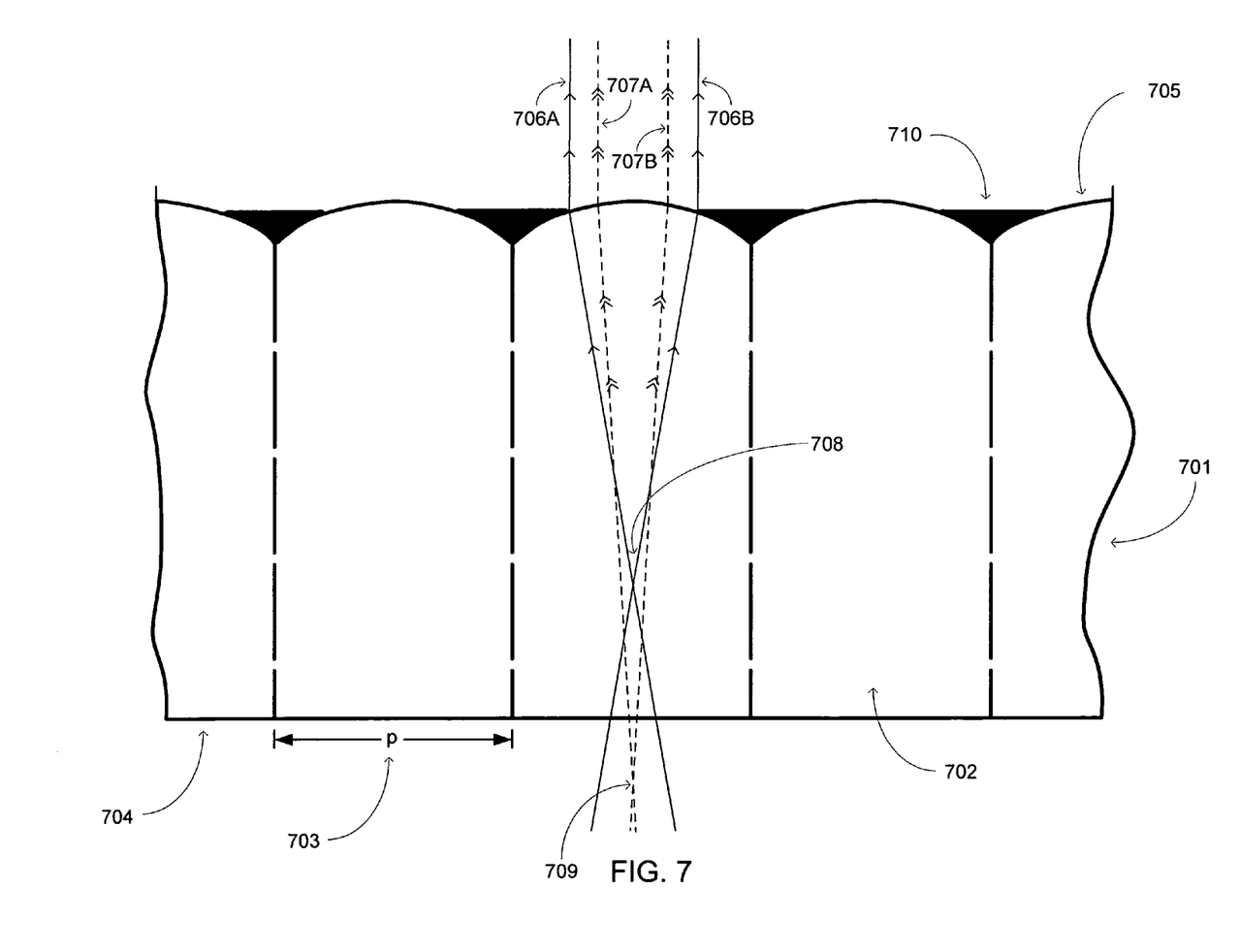
FIG. 7 illustrates a lenticular screen with a ray diagram showing the improvement of aperture correction with regard to spherical aberration.
Figure 8:
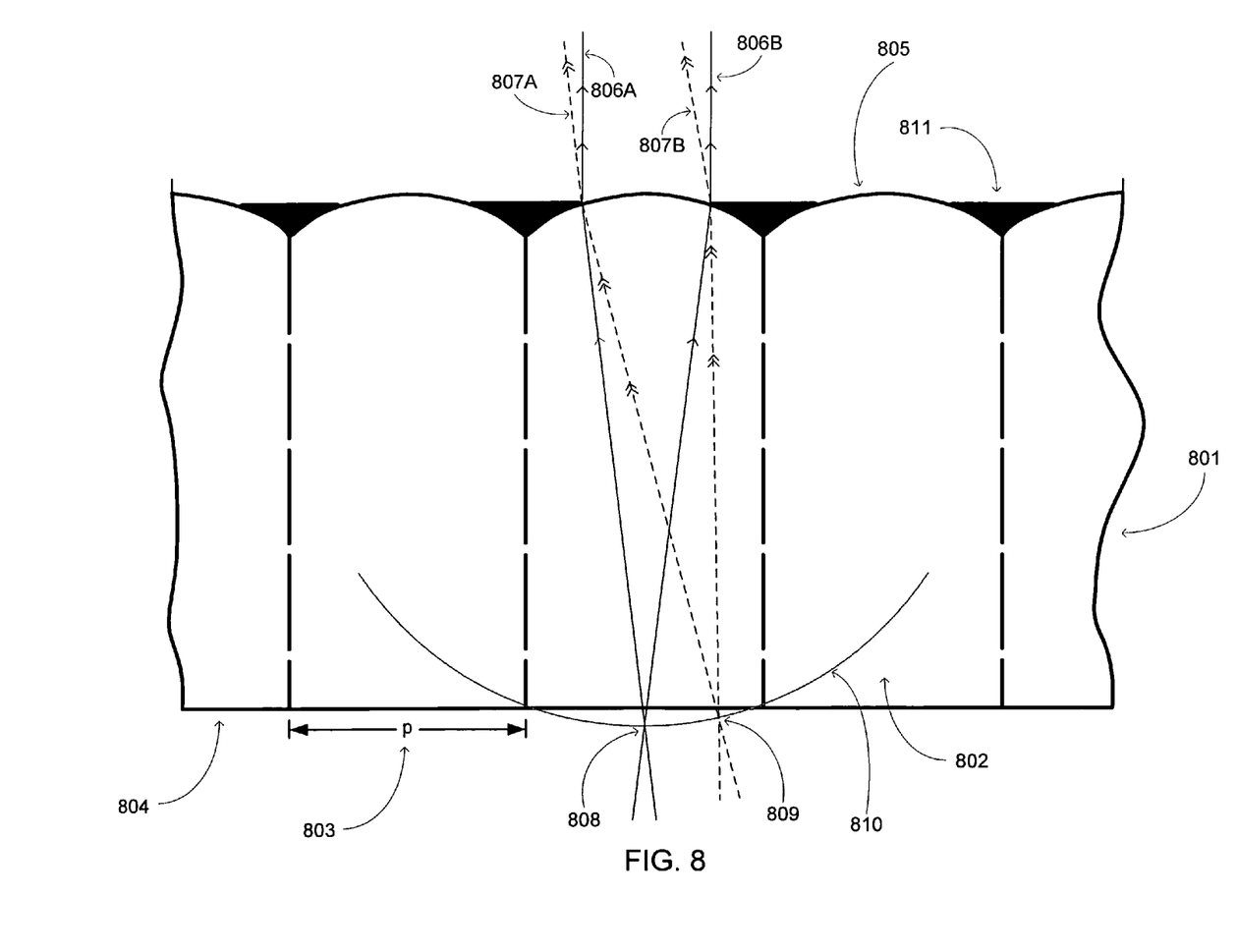
FIG. 8 illustrates a lenticular screen whose lenticules exhibit curvature of field, showing aperture correction.
Figure 9:
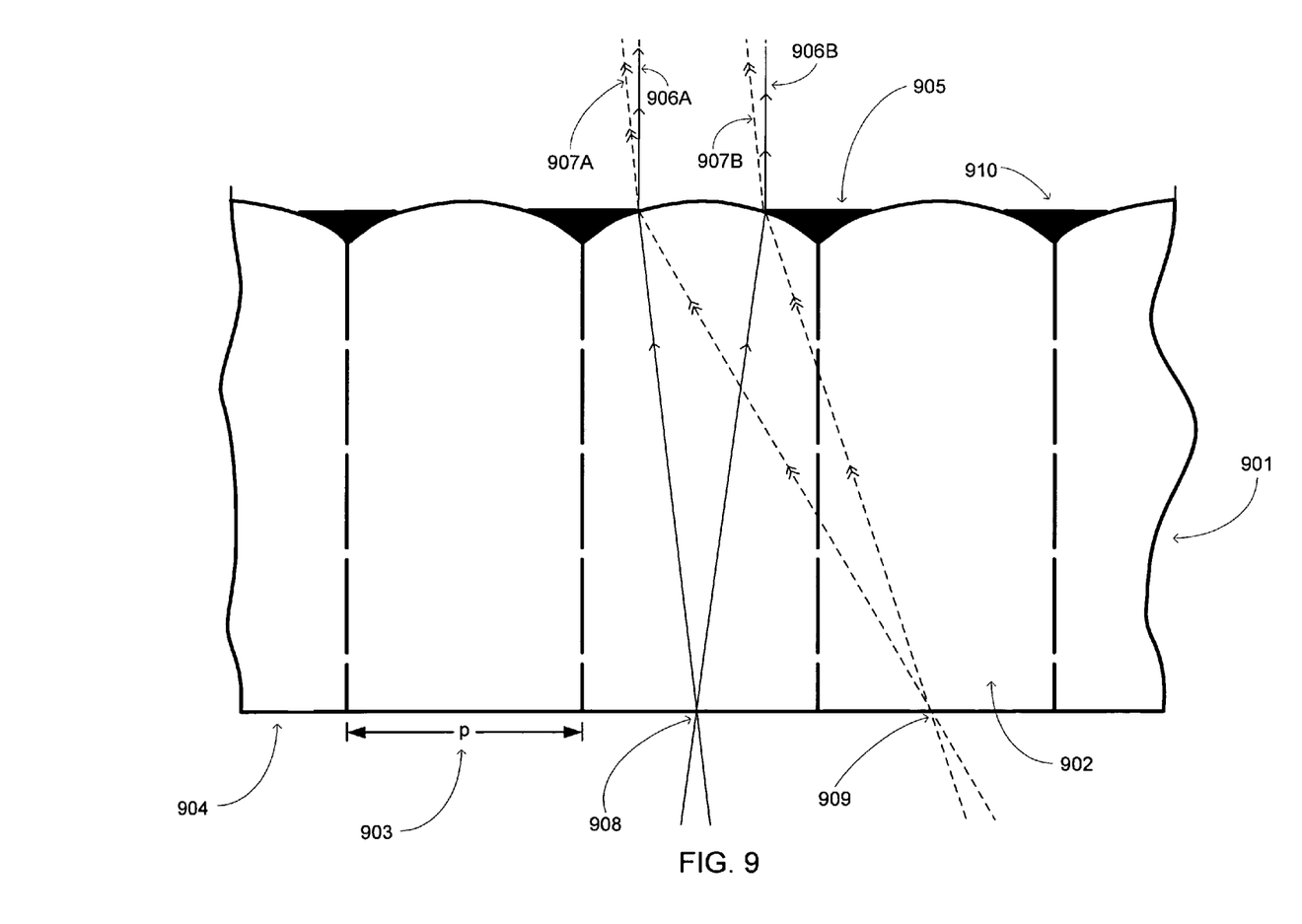
FIG. 9 is a ray trace diagram of the cross-section of a lenticular screen, illustrating how the aperture correction produces an improvement in the optical quality of off-axis viewing zones.

The benefits of the reduction are shown with respect to FIGS. 7, 8, and 9. FIG. 7 shows lens sheet 701 with individual lenticule 702 whose pitch P 703 is presented together with display surface 704. The top surface 705 of the lens is shown. The aperture-reducing material 710 is shown. In this case there is a reduction of spherical aberration because the outer rays touch the aperture. Rays 706A and 706B (single-headed arrows) form a point of sharp focus at point 708. Rays 707A and 707B, indicated by double-headed arrows, form a point of sharp focus 709. The rays here are more nearly parallel, the focus spot is a tighter, smaller spot, and focus is improved.

In FIG. 8 an improvement in curvature of field is shown, because lens sheet 801 with individual lenticule 802, given pitch P 803 and display surface 804, now has a narrower angle at the focus point. This can be illustrated by looking at the parallel rays 806A and 806B that come to focus at point 808.

The on-axial rays 806A and 806B are indicated by single-headed arrows. Rays 807A and 807B, which are indicated by double-headed arrows, come to a focal point 809 on curve 810. The rays are now more nearly parallel, or form a focus point at a less steep angle. Accordingly, the curvature of field becomes less of a problem because the image points are tighter and smaller as they cross the image-forming surface 804.

FIG. 9 presents the operation of secondary and tertiary viewing zones. Lens sheet 901 is shown, including individual lenticule 902, where pitch P 903 is illustrated with display surface 904. Curvature 905 is the curvature of the lenticule and opaque material 910 has been applied to reduce the aperture. Rays 906A and 906B are on-axial parallel rays that are out at the edge of the aperture, illustrated by single-headed arrows. Rays 906A and 906B come to focal point 908. Rays 907A and 907B are non-axial points that are refracted and form image point 909 in lenticule 902. Rays 907A and 907B are illustrated with double-headed arrows. An observer seeing the non-primary viewing zone sees a sharper image because the rays are more nearly parallel and the focus spot is a tighter, smaller point. Thus by using the opaque material, the present design improves the depth of field (or the depth of focus, more properly) of the lens elements. This improvement in depth of focus helps both non-primary viewing zone viewing and correction of both spherical aberration and curvature of field.

The result of this is a lens sheet that has one significant reduction in quality, namely brightness. Such a design is typically less bright than a normal lens sheet, but likely far brighter than a raster barrier display. The modern flat panel displays can be extremely bright, so a small sacrifice in brightness—even a loss of half or a third of the brightness—still produces a reasonably bright display. But the end result now is an image with much greater "pop." Off-screen effects before any image breakdown are noticeably improved, larger values of parallax can hold up, and the parallax budget of the display has been greatly expanded. The benefit is a highly enhanced stereoscopic effect.

In addition, the secondary and tertiary viewing zones have vastly improved sharpness. And, indeed, there will be more of them because the image-forming rays as shown in FIG. 9 are more nearly parallel.

The present design lens sheet configuration may reduce overall brightness. This method will be less bright than a normal lens sheet, but may be far brighter than current raster barrier display designs. Today's flat panel monitor devices can be extremely bright, so the reduction in brightness associated with the present design may still display a reasonably bright image. In contrast, the present design can render images with a very much greater "pop" or a more pleasing overall effect. In addition, the present design can improve the off-screen effects before any image breakdown occurs and allow larger values of parallax to be realized. The parallax budget of an autostereoscopic display according to the present design can be greatly expanded and produce what is known as a deep stereoscopic effect. The secondary and tertiary viewing zones may yield images with improved sharpness and may provide additional off-axis viewing zones resulting from the image-forming rays as illustrated in FIG. 9 become nearly parallel.

Enhanced Correction—Soft Aperturing

Another aspect of aperturing lenticular arrays is the suppression of optical diffraction effects. Lenses can only image within a diffraction limit determined by their physical size. With autostereoscopic displays, lenticular elements determine the pixel size of the viewed image, and thus smaller elements are generally preferred. The eye resolves down to one minute of arc, a physiological phenomenon dictating the maximum size of lens elements.

For a display positioned two meters from a viewer, one minute of arc translates into a minimal resolvable pixel size of 0.6 mm and implies a desired RGB color sub-pixel size of 0.2 mm; the size of a desired lens element. Simple diffraction estimation gives the angular spread of light through an aperture of size d as $\lambda/d$, where $\lambda$ is the wavelength of visible light, approximately 0.5 µm. At a two meter viewing distance (D), this corresponds to a "smearing" of 5 mm from a desired 0.2 mm (d) lens. Compared with the average inter-ocular separation of 65 mm (the maximum size of an autostereoscopic viewing region), such smearing appears to be sufficiently small to be ignored.

Smearing is not confined to the angular spread given by the simple formula, but determined by the one dimensional Fourier transform of the lens aperture written analytically as:

$$\sin^2(\pi dx/\lambda D)/(\pi dx/\lambda D)^2 \quad (1)$$

where x is the side-to-side distance of the aperture in the plane of the viewer.

Figure 10A:
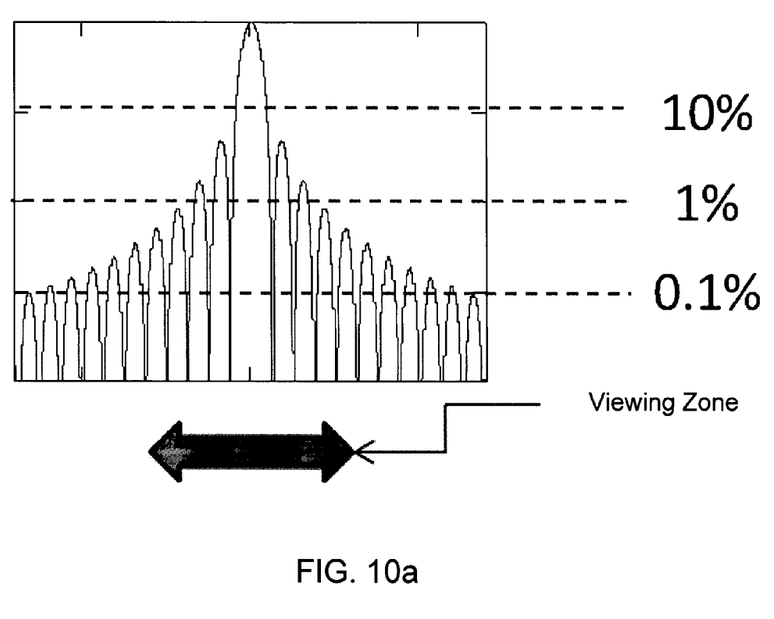
FIG. 10a is the normalized diffracted intensity from a point source in the viewing region of an autostereoscopic system imaged through a 200 μm cylindrical lens.
Figure 10B:
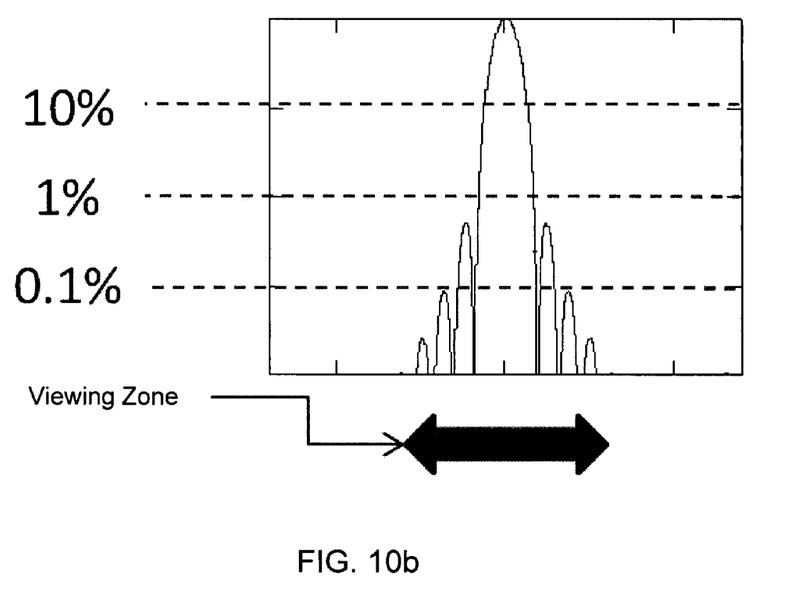
FIG. 10b shows the normalized diffracted intensity from a point source in the viewing region of an autostereoscopic system imaged through a 200 μm cylindrical lens with soft aperturing.

FIGS. 10*a* and 10*b* plot the normalized diffracted intensity from a point source in the viewing region of an autostereoscopic system imaged through a 200 µm cylindrical lens without and with soft aperturing, respectively. The first zero plotted in FIG. 10*a* corresponds to the first estimation of the spread above in Equation (1). In actuality, the intensity of the diffraction peaks fade gradually, described by $(\lambda D/\pi dx)^2$. Crosstalk at the center of a viewing region from both neighboring views (at a maximum distance of approximately 30 mm away) is significant, greater than 0.3 percent, further increasing toward the edges.

Figure 11A:
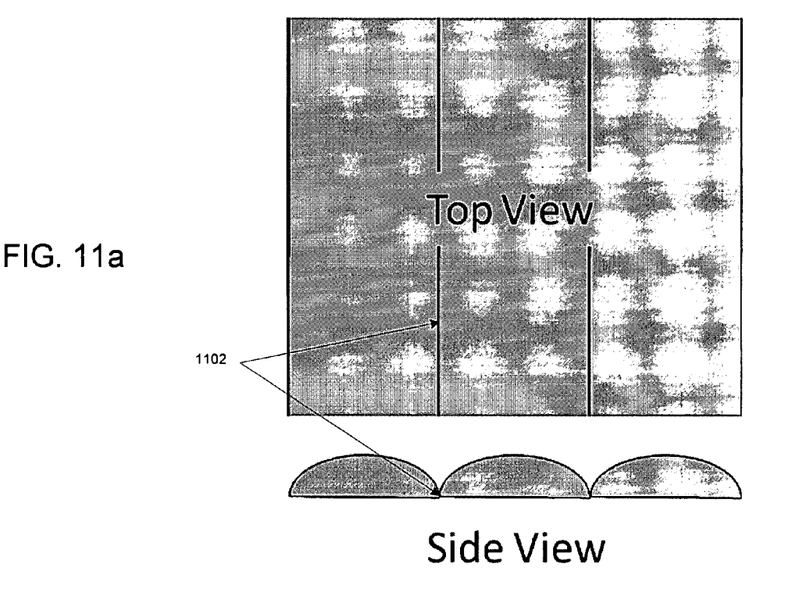
FIG. 11a illustrates a cross section of an unaltered cylindrical lenticular array.
Figure 11B:
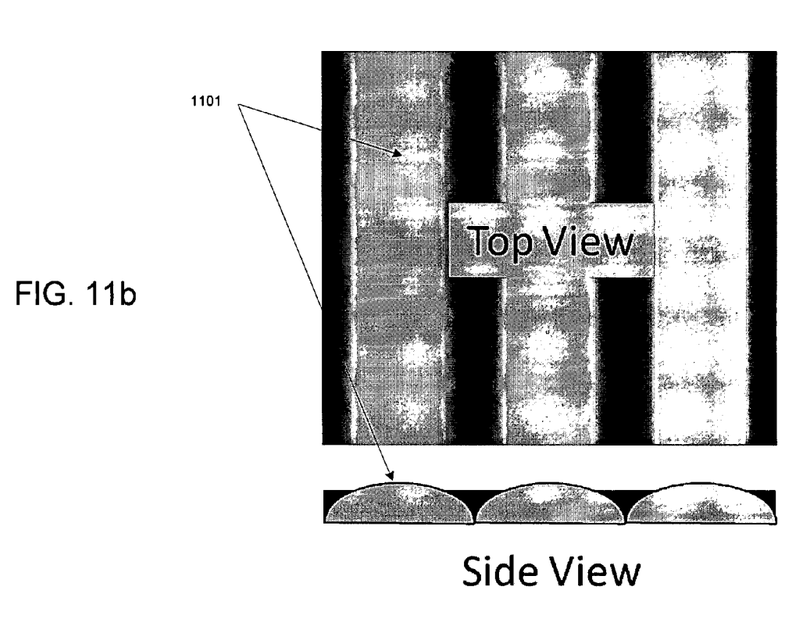
FIG. 11b is a cross section of a soft apertured cylindrical lenticular array.

FIGS. 11*a* and 11*b* show the structure of bare and soft-apertured lenses, respectively. To reduce diffraction conventional windowing techniques can be employed, where windowing techniques are signal processing techniques employed to create a specific signal profile where the function employed has a value of zero outside a specific boundary.

Windowing is most commonly used to filter temporally varying signals to reduce temporal side-lobes or 'ringing' which would otherwise act to reduce signal bandwidth. Windowing and side-lobes are relevant here since the relationship between the time and frequency domains are mathematically analogous to those that relate angle scattering to spatial constriction, i.e. diffraction.

The most common windowing techniques are cosine and Hamming windows. Windowing softens the edges of the aperture and can reduce diffraction side-lobes. A simple cosine amplitude variation over the lens can reduce side lobes to an inconsequential level such as is shown in FIG. 10*b*. In practice any softening of the edges can dramatically reduce diffraction and improve autostereoscopic crosstalk.

Application of material in soft aperturing comprises applying material to the lens array such that the signal transmitted to the lens array is partially obscured by the material resulting in a transmitted signal profile having properties similar to the profile of FIG. 10*b*. In other words, without material applied, the signal transmitted from the lenticular screen is similar to the profile of FIG. 10*a*. Material is applied such that the resultant signal has properties similar to FIG. 10*b*, and thus the lenticular screen acts as a filter for the received signal and application of material through the soft aperturing described herein performs the function of further filtering the signal such as by a Hamming or cosine window. Thus the soft aperturing described herein may be applied to any type of lenticular screen, including one having lenticules slanted at an angle such as the Winnek angle or in a fly eye lens arrangement. The result is the filtering described being applied to the uncompensated lenticular screen by application of material in a soft aperturing manner as described.

Cosine windowing equations and parameters are generally known in the art or easily accessible from signal processing literature and resources. In the present application of windowing, it is to be noted that precise conformance to classic windowing definitions is not required. Rather, soft aperturing can be effective in this optic/lensing design when material is applied in a manner generally similar to the aforementioned windowing techniques, but the application of material does not need to result in a precise windowing function result or match precise equations of windowing known in the art. Application of material in a manner approximating a windowing function is generally sufficient for the present design.

The present design employs these functions in the design of the individual lenticules and covering portions of the lenses with a material according to equations such as the foregoing, a procedure referred to as soft aperturing. Soft aperturing is therefore covering portions of the lenticules, and as noted herein, use of signal processing windowing techniques such as cosine or Hamming or other windowing techniques may be helpful in producing the signal shown in FIG. 10b. Thus the present design entails taking the lenticule profile into consideration and applying soft aperturing such as according to a windowing equation to establish regions of the lenticules for blocking or obscuring.

Note that one aspect of soft aperturing is the gradual tapering of material at the edges of the material being filled into the joints of the lenticular screen. This soft aperturing is in contrast to hard aperturing, or application of material to a lenticular screen where a hard edge or clear line is formed from the material. Soft aperturing can be employed in the manner suggested, such as forming a Hamming or cosine window, or may simply entail the gradual tapering of material toward the lenticule, and may be employed with any type of lenticular screen (angled lenticules, fly eye lens, etc.) without the specific windowing described herein.

FIGS. 11a and 11b show cross sections of a bare cylindrical lenticular array and a soft apertured cylindrical lenticular array, respectively. The present aspect of the current design thus apertures lenticular elements in such a way to soften edges and reduce diffraction using the structure of the lens to control optical density. In the bare case of FIG. 11a, lens apertures 1101 are defined by the physical size of the individual lenses, each lens defined by an undesirable abrupt edge line such as line 1102. FIG. 11a also shows the tapered profile of the lens height in the region on either side of this line.

Depositing an absorbing material in the valley region between lenses such as is shown in FIG. 11b provides a material whose thickness (and hence absorption) varies as a function of distance from the lens edge. Such absorption variance provides a convenient amplitude modulation and can reduce harsh diffraction effects. Methods of depositing material can include application of solvents whereby a dye material contained within a solvent could be first applied to the surface of the lenses at a controlled thickness, using for example the established 'doctor-blade' technique, wherein a metal strip or other blade-like surface is used to wipe solvent off desired areas of the lenses, leaving solvent inside the desired lens areas. The solvent can then be allowed to evaporate leaving the remaining material in the gaps between the lenses as desired.

An alternative approach uses a UV-curing material containing dye material and deposits this material on the surface of the lenses. Exposure occurs through the UV-absorbing lenses such that those regions with less lens material (the so-called valleys) cure, allowing those regions above the lenses to remain uncured for removal at a later process stage.

In summary, soft aperturing cuts light from the joints between the cylindrical lenses. This helps in the first instance by cutting light from 'bad' regions of the lens. Additionally, soft aperturing suppresses unwanted diffraction effects with very narrow lenses (~300 um) by the black stripes formed by the material gradually becoming transparent at their edges. Striping in this manner looks to the eye (under a microscope) as if the stripes have fuzzy, non-sharp edges. The precise tapering of the optical attenuation is optional to the designer, although certain optimal profiles (cosine, Hamming windowing, etc.) optimize high angle scattering beyond any practical relevance. Any tapering, or any soft aperturing is helpful in this lenticular screen environment. To fabricate, dye is placed into an encapsulating material of a known refractive index which works with that of the lens to provide an appropriate focal length.

What has been shown will be appreciated by a worker with ordinary skill in the art as having produced an aperture reduction that produces a consequential improvement in image quality. This aperture reduction has been achieved without requiring precision location of a multiplicity of apertures, because it is essentially self-locating in terms of its manufacturing process. In addition, there is a vast improvement in image quality for certain viewing zones. And, indeed, additional viewing zones are now possible that can be viewed and enjoyed, and that have enhanced quality. In other words, the overall stereoscopic effect is vastly extended and improved. Further, using the soft aperturing technique can improve crosstalk due to diffraction without introducing significant manufacturing cost.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. An apparatus comprising:
an autostereoscopic image selection device comprising a plurality of lenticules; and
at least one buffed portion comprising an opaque material applied to the autostereoscopic image selection device in gaps between the plurality of lenticules;
wherein the opaque material is applied to the autostereoscopic image selection device in a soft aperturing manner, said soft aperturing manner comprising applying the opaque material such that the opaque material is tapered from the gaps over the plurality of lenticules, wherein the autostereoscopic image selection device in combination with the at least one buffed portion enables the lens surface area to render aperture-corrected autostereoscopic images.

2. The apparatus of claim 1, wherein the opaque material is applied in accordance with a windowing function.

3. The apparatus of claim 2, wherein the windowing function comprises one from a group comprising cosine windowing and Hamming windowing.

4. The apparatus of claim 1, wherein the autostereoscopic image selection device is a lenticular screen.

5. The apparatus of claim 1, wherein the opaque material is applied to individual elements formed on the autostereoscopic image selection device and subsequently partially removed from the individual elements by cleaning off excess opaque material from the autostereoscopic image selection device.

6. The apparatus of claim 1, wherein the opaque material is formed from a waxy material.

7. The apparatus of claim 1, wherein the opaque material is formed from an International Ink Company (INX) pigment material.

8. The apparatus of claim 1, wherein the opaque material is applied to individual elements formed on the autostereoscopic image selection device and subsequently partially removed from the individual elements.

9. The apparatus of claim 8, wherein partial removal comprises buffing the opaque material to enable the apparatus to render aperture-corrected autostereoscopic images.

10. A method for providing an enhanced image selection device, comprising:
 applying an opaque overcoat material to an image selection device comprising a plurality of lenticules; and
 removing selected portions of the opaque overcoat material from the image selection device;
 wherein the applying and removing operate together with the image selection device to provide a tapered opaque coating that obscures portions of the lenticules according to a soft aperturing technique, wherein the tapered opaque coating comprises appearance of the opaque overcoat material being gradually reduced from opaque at a center of each gap between lenticules to transparent at edges of the opaque overcoat material.

11. The method of claim 10, wherein the soft aperturing technique comprises a windowing technique.

12. The method of claim 11, wherein the windowing technique comprises one from a group comprising cosine windowing and Hamming windowing.

13. The method of claim 10, wherein removing comprises buffing a portion of the opaque overcoat material to configure the lens surface area for rendering soft aperture-corrected autostereoscopic images.

14. The method of claim 10, wherein removing comprises applying pressure while polishing opaque overcoat material on the lenticular screen to reveal a top lenticule surface, thereby forming a reduced section of a cylinder for aperture correction.

15. A method for constructing an aperturing device usable with a display, comprising:
 providing an image selection device comprising a plurality of lenses;
 applying an overcoat material to the image selection device; and
 removing a portion of the overcoat material from at least one lens, creating a tapered optical attenuation coated lens array;
 wherein appearance of the overcoat material on the optical attenuation coated lens array is gradually reduced from opaque at a center of each gap between lenses to transparent at edges of the overcoat material.

16. The method of claim 15, wherein removing the portion of the overcoat material effectively applies a windowing function to the image selection device.

17. The method of claim 16, wherein the windowing function comprises one from a group comprising cosine windowing and Hamming windowing.

18. The method of claim 15, wherein removing comprises buffing a portion of the overcoat material to configure at least one lens surface area for rendering soft aperture-corrected autostereoscopic images.

19. The method of claim 15, wherein the image selection device comprises a lenticular screen.

20. The method of claim 15, wherein the image selection device comprises a fly eye lens.

21. The method of claim 15, wherein removing comprises buffing the overcoat material to configure surface area of at least one lens for rendering soft aperture-corrected autostereoscopic images.

22. The method of claim 15, wherein removing comprises applying pressure while buffing the lenticular screen to reveal top lens surfaces, thereby forming a reduced section of the lenticule for aperture correction.

* * * * *